Nov. 5, 1946.    F. M. CLARK    2,410,715
HYDROGENATED OIL COMPOSITION
Filed March 10, 1945    2 Sheets-Sheet 1

Inventor:
Frank M. Clark,
by Harry E. Dunham
His Attorney.

Inventor:
Frank M. Clark,
by Harry E. Dunham
His Attorney.

Patented Nov. 5, 1946

2,410,715

UNITED STATES PATENT OFFICE 2,410,715

HYDROGENATED OIL COMPOSITION

Frank M. Clark, Pittsfield, Mass., assignor to General Electric Company, a corporation of New York Application March 10, 1945, Serial No. 582,174

8 Claims. (Cl. 252—64)

The present application is a continuation-in-part of my application Serial No. 511,571, filed November 24, 1943, which in turn is a continuation-in-part of prior application Serial No. 436,930, filed March 31, 1942.

The present invention comprises compositions suitable for use in the insulating and dielectric fields. Such compositions include as essential ingredients aromatic sulfone and hydrogenated vegetable oil.

Figure 1:
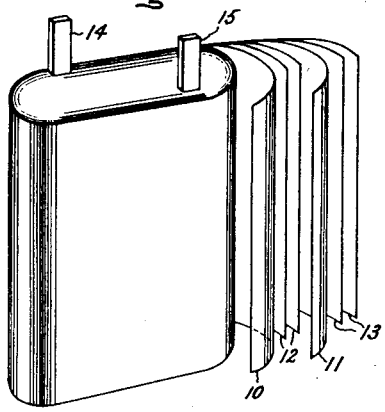
Figure 2:
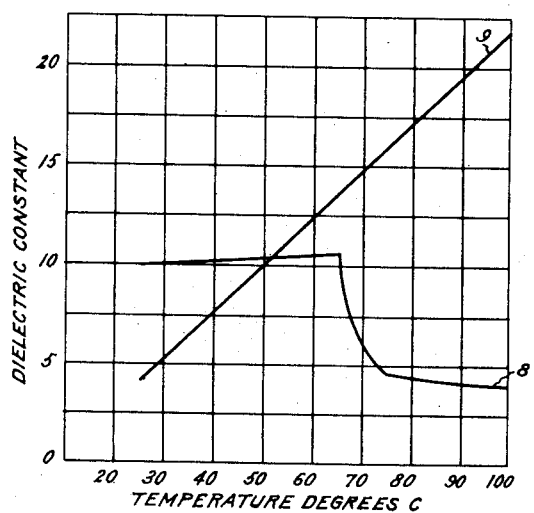
Figure 3:
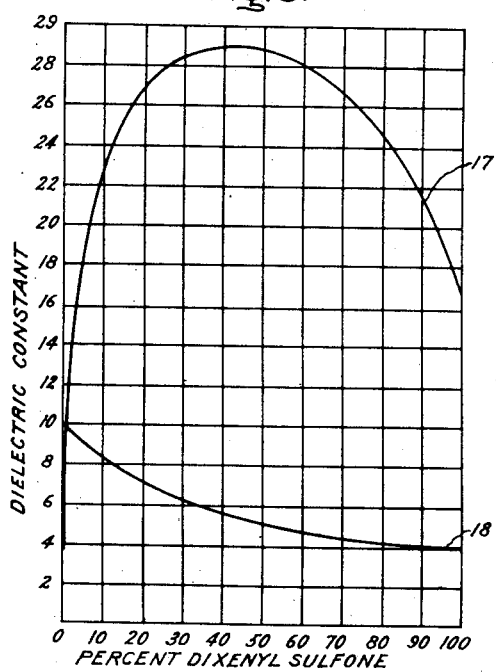
Figure 4:
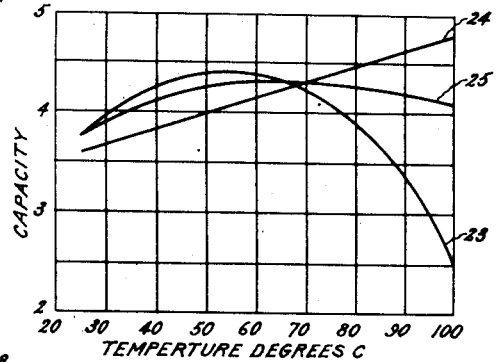
Figure 5:
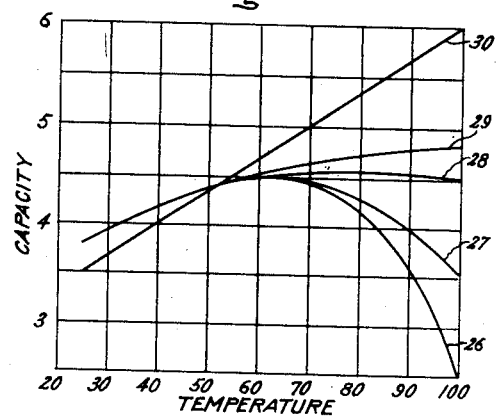
Figure 6:
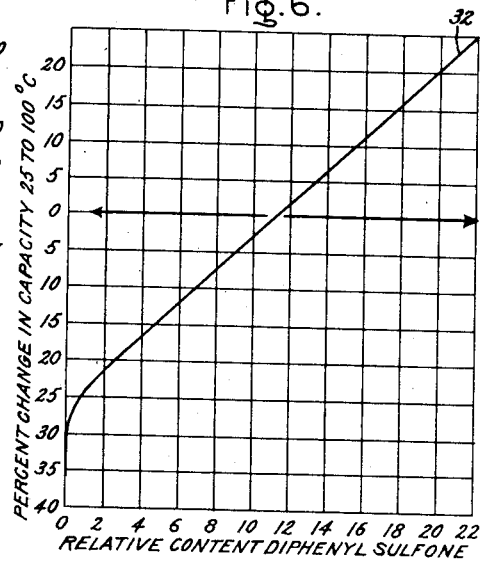
Figure 7:
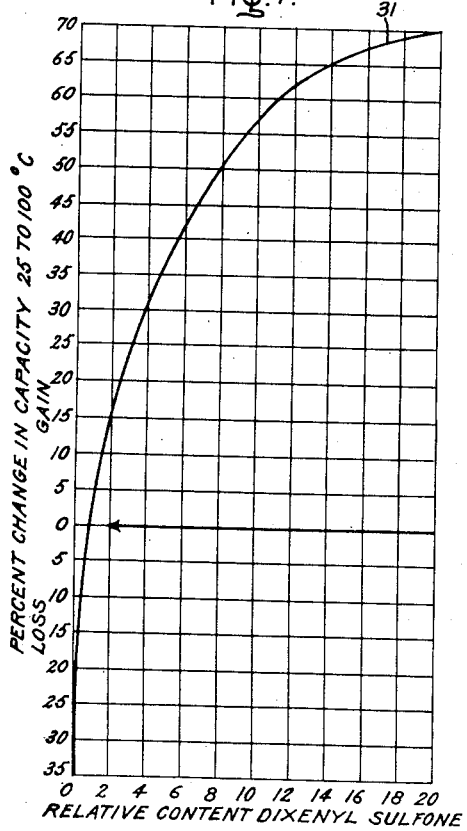
Figure 8:
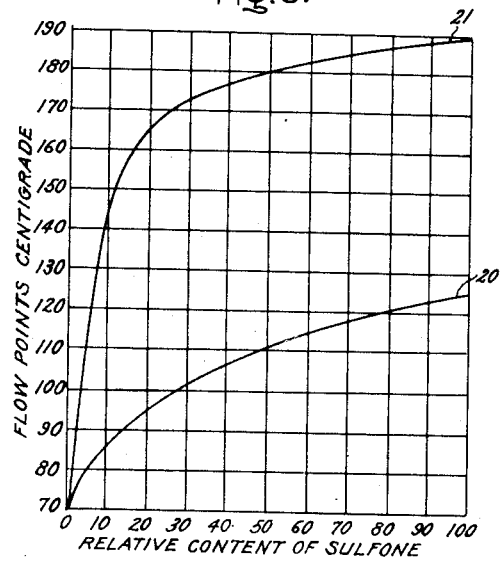

In the accompanying drawings Fig. 1 is a perspective view of a wound-type capacitor shown partly unrolled; Fig. 2 comprises graphs showing dielectric characteristics over a range of temperatures respectively of dixenyl sulfone and hydrogenated castor oil; Fig. 3 comprises graphs showing the dielectric constant at a given temperature of compositions comprising various mixtures of these compounds; Fig. 4 comprises graphs showing relative capacity values over a range of temperatures of capacitors respectively of compositions containing diphenyl sulfone; Fig. 5 comprises graphs similarly showing comparative capacity values for compositions containing dixenyl sulfone; Figs. 6 and 7 are graphs respectively showing the per cent change in capacity over a range of temperatures of capacitors containing different amounts of two chosen sulfones; and in Fig. 8 are shown graphs of the flow points of a range of sulfone compositions.

Compositions containing ingredients chosen from these two classes possess, as will be shown, advantageous properties not possessed by either ingredient. Aromatic sulfones when used unassociated with other materials as dielectric materials in capacitors are characterized by high energy loss which under some conditions leads to overheating with resultant short life.

Capacitors containing hydrogenated castor oil (commercially known as opal wax) are characterized by high capacitance but they possess the disadvantageous feature of being subject to a reduction of about 40 per cent capacity if their temperature rises above about 65° C. In many instances capacitors are required to operate under ambient temperatures of about 90 to 100° C., and even higher temperatures.

Comparative figures will make this advantage more readily appreciated. At 25° C. a capacity of given size and construction when impregnated with mineral oil has a capacity of 2.5 microfarads. A similar capacitor impregnated with opal wax has a capacity of 3.75 microfarads. At 100° C. the oil-treated capacitor has substantially unchanged capacity whereas the capacity of the opal wax-treated capacitor has fallen to 2.5 microfarads. Such a large change in capacity may have serious results in an electrical system containing the variable capacitor.

This reduction in capacity of an opal wax-treated capacitor is due to the reduction in dielectric constant at about 65° C. as shown by graph 8 of Fig. 2. A sulfone, on the other hand, as shown by the graph 9, is characterized by a rise of dielectric constant from 25° C. to 100° C.

The association of aromatic sulfone with hydrogenated vegetable wax, even in small amounts, has an unexpectedly large effect in reducing the fall of capacity which characterizes a hydrogenated oil without entailing a corresponding increase in power factor.

Depending on the effect to be produced, compositions embodying my invention vary in sulfone content over a wide range, as will be evident.

The novel features of my invention will be pointed out with greater particularity in the appended claims.

Capacitors embodying my invention may consist, as shown in Fig. 1, of armatures composed of strips of metal foil 10, 11 which are separated by sets of paper spacers 12, 13. The armatures are shown as being separated by two sheets of paper as representative of any desired plurality of sheets. Terminal strips 14, 15 as usual make electrical contact to the armatures 10, 11. Although marked beneficial effects are obtained when the amount of sulfone present is as low as one per cent, the proportion of aromatic sulfone in my new dielectric composition may be much greater. Capacitors impregnated with compositions containing by weight 75 per cent of sulfone and 25 per cent of hydrogenated oil have a higher capacity than can be obtained with either class of impregnants used individually.

As shown by graph 17 of Fig. 3, the presence of even small amounts of a sulfone approximating one per cent greatly increases the dielectric constant of hydrogenated castor oil at elevated temperatures. In contrast the increase in the amount of sulfone present leads to decreased dielectric constant at room temperature (25° C.). This is shown by graph 18 of this figure. Graph 17, showing the dielectric constants at 100° C. of different compositions of opal wax and dixenyl sulfone, shows that the dielectric constant at 100° C. is maximum when the compositions contain about 25 to 60 per cent of this sulfone.

The flow point of compositions of opal wax and a sulfone rises with increase of sulfone content over the entire range of sulfone additions.

Graph 20 of Fig. 8 is illustrative of the rise of flow point in compositions of opal wax and diphenyl sulfone as the content of sulfone increases. Graph 21 is illustrative of the rise of flow point of compositions of opal wax and dixenyl sulfone as the content of sulfone increases. Up to about 25 per cent of sulfone content, the rise of flow point is most marked.

If it is desired that capacitors containing such improved dielectric compositions should operate with variations in capacity not to exceed about 10 per cent in the range of 25 to 100° C., then the content of sulfone in the composition ordinarily should be chosen from a relatively narrow range which varies for different sulfones. In the case of compositions containing dixenyl sulfone an amount as low as about one per cent results in substantial constancy of capacity when the temperature varies from 25 to 100° C. In compositions containing diphenyl sulfone, approximately 11 per cent should be present in order to obtain substantial constancy of capacity.

In Fig. 4, graph 23 shows the capacity relation to temperature of capacitor units containing paper impregnated with opal wax. It is evident that the capacity falls rapidly as the temperature rises from about 65 to 100° C. As shown by the graph 24, a composition containing by weight about 75 parts of opal wax and 25 parts of diphenyl sulfone is characterized by a rise of capacity over the same range of temperatures. Capacitors impregnated with compositions of about 85 parts of opal wax and 15 parts of this sulfone are characterized by little change of capacity with rise of temperature in this range, as shown by the graph 25. Some increase of capacity occurs as the temperature rises to about 60° C. from room temperature. The capacity falls slightly as the temperature rises to 100° C. At this temperature it is very little higher than at 25° C. For some capacitor applications it is desirable to have a minimum change of capacity with temperature change.

Fig. 5 shows similar relations for compositions of opal wax and dixenyl sulfone. For comparative purposes, graph 26 illustrates the capacity-temperature relation of opal wax. At 25° C. the capacity of a given capacitor is about 3.75 units. At 65° C. the capacity begins to fall rapidly with rise of temperature. At 100° C. the capacity has fallen to about 2.5 units. The addition of even one per cent by weight of dixenyl sulfone produces a marked effect. As shown by graph 27 of Fig. 5, at 100° C. the capacity is about 3.5 units which is very close to the initial capacity. The addition of 2 per cent of this sulfone has a more marked effect as shown by graph 28. Compositions comprising by weight 95 parts of opal wax and 5 parts of dixenyl sulfone are characterized, as shown by the graph 29, by a gradual increase in capacity as the temperature rises from 25 to 100° C. Graph 30 shows temperature-capacity characteristics for opal wax compositions containing 20 per cent of this sulfone.

Graph 31 of Fig. 7 indicates changes in capacity values as the temperature rises from 25 to 100° C. for a range of compositions comprising opal wax and dixenyl sulfone. Opal wax impregnants containing about one per cent of dixenyl sulfone result in the capacitor having substantially the same capacity at 100° C. as at 25° C. For lesser amounts of sulfone the 100° C. capacity is lower than the 25° C. capacity. Larger contents than one per cent of this sulfone in the impregnant of a capacitor result in progressively greater capacity changes as the temperature of the capacitor rises from 25 to 100° C.

As shown in Fig. 6 by the curve 32 compositions containing about 11 per cent of diphenyl sulfone, the balance being opal wax, have about the same capacity at 100° C. as at 25° C. Lower sulfone contents result in lowered capacity as the temperature rises from 25 to 100° C. Greater sulfone content results in a rise of capacity.

Although in the examples heretofore discussed I have particularly referred to diphenyl sulfone, and dixenyl sulfone, I wish it to be understood that other sulfones, the dielectric constant of which increases with rise of temperature, may be used for the purposes of my invention.

| | Dielectric constant at 25° C. | Dielectric constant at 100° C. | Melting point, degrees C. |
|---|---|---|---|
| Dixenyl sulfone | 4 | 17 | 190–200 |
| Diphenyl sulfone | 5.1 | 22 | 123–126 |
| Phenyl xenyl sulfone | 2.8 | 14 | 143–146 |
| Dimethyl diphenyl sulfone | 3.5 | 25 | 65–70 |
| Dinaphthyl sulfone | 2.9 | 11.6 | 61 |
| Phenyl naphthyl sulfone | 2.3 | 16.1 | 30–35 |
| Dichlor phenyl tolyl sulfone | 7.0 | 14.0 | 25–30 |
| Monochlor phenyl tolyl sulfone | 3.8 | 18 | 121 |

I have also referred particularly to hydrogenated castor oil as an example of a suitable hydrogenated oil. I wish it to be understood that other hydrogenated vegetable oils may be similarly used, as for example hydrogenated cottonseed oil and hydrogenated linseed oil.

My invention is not restricted to compositions consisting solely of hydrogenated vegetable oil and an aromatic sulfone.

Additional ingredients may be present as exemplified by the addition of chlorinated diphenyl and betachlor anthraquinone as components. For example, capacitor impregnants containing the following range of ingredients by weight are characterized by a substantially stable capacity over a wide range of temperatures:

| | Per cent |
|---|---|
| Hydrogenated castor oil | 92 to 96 |
| Pentachlor diphenyl | 6 to 1.99 |
| Dinaphthyl sulfone | 1.94 to 1.99 |
| Betachlor anthraquinone | .06 to .02 |

A capacitor dielectric composition consisting by weight of 92 per cent hydrogenated castor oil, 6 per cent pentachlor diphenyl, 1.94 per cent of dinaphthyl sulfone and .06 per cent of betachlor anthraquinone when employed as an impregnant for capacitors containing three sheets of .0004 kraft paper is characterized by substantially constant capacity of an ambient temperature range of 25 to 125° C.

Substantially constant capacity over the same temperature range characterizes similar capacitors impregnated with a composition consisting by weight of 86 per cent of hydrogenated castor oil, 10.5 per cent of pentachlor diphenyl, 3.5 per cent dimethyl diphenyl sulfone and .1 per cent of betachlor anthraquinone.

What I claim as new and desire to secure by Letters Patent of the United States is:

1. A composition of matter comprising by weight about 1 to 60 parts of aromatic sulfone and about 99 to 40 parts of hydrogenated castor oil.

2. A composition of matter consisting of by weight about 1 to 60 per cent of dixenyl sulfone and about 99 to 40 per cent of hydrogenated castor oil.

3. A dielectric material suitable for use in electric capacitors consisting of by weight about 2 per cent of dixenyl sulfone and about 98 per cent of hydrogenated castor oil.

4. A dielectric range of compositions which are suitable for the impregnation of capacitors in which the armatures are separated by paper spacers, said compositions consisting of about 25 to 60 per cent of dixenyl sulfone and about 75 to 40 per cent of hydrogenated castor oil.

5. A range of dielectric compositions consisting of about 99 to 85 per cent of hydrogenated vegetable oil and about 1 to 15 per cent of aromatic sulfone.

6. A dielectric composition comprising by weight about 85 to 99 parts of hydrogenated castor oil, about 1 to 15 parts of aromatic sulfone, and about 2 to 10 parts of chlorinated diphenyl.

7. A dielectric composition which is suitable for use in electric capacitors consisting by weight of about 1 to 15 per cent of aromatic sulfone and about 99 to 85 per cent of hydrogenated castor oil.

8. A dielectric composition consisting mainly of hydrogenated castor oil and containing approximately 6 per cent of pentachlor diphenyl and approximately 2 per cent of aromatic sulfone.

FRANK M. CLARK.

Certificate of Correction

Patent No. 2,410,715.                                                                                                    November 5, 1946.

FRANK M. CLARK

It is hereby certified that errors appear in the printed specification of the above numbered patent requiring correction as follows: Column 1, line 48, for the word "advantage" read *disadvantage*; column 5, line 4, claim 4, for "dielectric range of" read *range of dielectric*; and that the said Letters Patent should be read with these corrections therein that the same may conform to the record of the case in the Patent Office.

Signed and sealed this 15th day of April, A. D. 1947.

[SEAL]

LESLIE FRAZER,
*First Assistant Commissioner of Patents.*